United States Patent
Liou et al.

(10) Patent No.: US 10,919,272 B2
(45) Date of Patent: Feb. 16, 2021

(54) FIBER COMPOSITION STRUCTURE

(71) Applicant: INDUSTRIAL TECHNOLOGY RESEARCH INSTITUTE, Hsinchu Hsien (TW)

(72) Inventors: Shir-Joe Liou, Hsinchu (TW); Jih-Hsiang Yeh, Hsinchu (TW)

(73) Assignee: INDUSTRIAL TECHNOLOGY RESEARCH INSTITUTE, Hsinchu Hsien (TW)

(*) Notice: Subject to any disclaimer, the term of this patent is extended or adjusted under 35 U.S.C. 154(b) by 0 days.

(21) Appl. No.: 16/845,194

(22) Filed: Apr. 10, 2020

(65) Prior Publication Data

US 2020/0324524 A1 Oct. 15, 2020

Related U.S. Application Data

(60) Provisional application No. 62/832,324, filed on Apr. 11, 2019.

(30) Foreign Application Priority Data

Jan. 2, 2020 (TW) .................. 109100051

(51) Int. Cl.
*B32B 27/06* (2006.01)
*B32B 27/12* (2006.01)

(52) U.S. Cl.
CPC ............ *B32B 27/06* (2013.01); *B32B 27/12* (2013.01)

(58) Field of Classification Search
CPC .................. B32B 27/06; B32B 27/12
See application file for complete search history.

(56) References Cited

U.S. PATENT DOCUMENTS

| 5,671,142 | A | 9/1997 | Tatarazako |
| 10,272,651 | B1 | 4/2019 | Liou et al. |
| 2006/0267235 | A1 | 11/2006 | Ma et al. |
| 2010/0173099 | A1 | 7/2010 | Saito et al. |
| 2011/0285049 | A1 | 11/2011 | Baker et al. |

(Continued)

FOREIGN PATENT DOCUMENTS

| CA | 2774403 | 5/2011 |
| CA | 2778607 | 5/2011 |

(Continued)

OTHER PUBLICATIONS

Taiwanese Office Action for Taiwanese Patent Application No. 109100051 dated Jul. 8, 2020.

(Continued)

*Primary Examiner* — Michael C Miggins
(74) *Attorney, Agent, or Firm* — Amin, Turocy & Watson, LLP (57) ABSTRACT

A fiber composite structure is provided that includes a plurality of fiber prepreg layers and at least one composite resin layer. The fiber prepreg layer includes a first resin and a plurality of fibers impregnated with the first resin. The composite resin layer includes a plurality of multilayered carbon nanotubes and a second resin, and is disposed between the two of the fiber prepreg layers. The composite resin layer and the fiber prepreg layers wind together to form a hollow tube body, in which the ratio of the number of layers of the composite resin layer to the fiber prepreg layers is from 1:4 to 1:7, and each composite resin layer covers 40% to 60% of the area of the adjacent fiber prepreg layers.

19 Claims, 7 Drawing Sheets

(56) References Cited

U.S. PATENT DOCUMENTS

2014/0154456 A1 6/2014 Liou et al.
2019/0111671 A1 4/2019 Liou et al.

FOREIGN PATENT DOCUMENTS

| | | |
|---|---|---|
| CN | 1369925 | 9/2002 |
| CN | 101250770 | 8/2008 |
| CN | 104742384 | 7/2015 |
| DE | 102010022469 | 12/2011 |
| JP | 58053769 | 3/1983 |
| JP | 50237896 | 11/1985 |
| JP | 2007095471 | 4/2007 |
| JP | 2009013327 | 1/2009 |
| JP | 2010147526 | 7/2010 |
| JP | 2011162898 | 8/2011 |
| TW | 200946302 | 11/2009 |
| TW | 201018084 | 5/2010 |
| TW | 201422862 | 6/2014 |

OTHER PUBLICATIONS

Zhou, et al. "Interfacial damping characteristics of carbon nanotube-based composites", Composites Science and Technology(64), 2004, 2425-2437.

Suhr, et al. "Viscoelasticity in carbon nanotube", Nature Materials, Feb. 1, 2005, 134-137.

Ghavanloo, et al. "Vibration and instability analysis of carbon nanotubes conveying fluid and resting on a linear viscoelastic Winkler foundation", Physica E May 1, 2010 (42) 2218-2224.

Gou, et al. "Development and characterization of carbon nanopaper-based nanocomposite materials", Proc. of SPIE 20060101v.6170 1O-1.

Fereidoon, et al. "Damping Augmentation of Epoxy Using Carbon Nanotubes", International Journal of Polymeric Materials(60) 2011, 11-26.

FIBER COMPOSITION STRUCTURE

CROSS-REFERENCE TO RELATED APPLICATIONS

This application claims the benefit under 35 U.S.C § 119(e) of Provisional Application No. 62/832,324 filed Apr. 11, 2019, and priority to Taiwanese Application Serial No. 109100051, filed on Jan. 2, 2020. The entirety of the above-mentioned patent applications are hereby incorporated by reference herein and made a part of the present specification.

BACKGROUND

1. Technical Field

The present disclosure relates to fiber composite structures having vibration damping characteristics.

2. Description of Related Art

Because polymeric fiber composite material-related products meet the requirements of light weight, high strength and high degree of freedom in design demanded by people, combining various functional characteristics and uses in various structural articles with light weight is an inevitable development trend today. However, composite materials are becoming thinner, lighter and shorter. The structural design focuses on high strength. Materials with higher physical strength often have increased brittleness, so when the materials are stressed, they will break due to the brittleness. In order to solve this problem, the damping characteristics of the materials must be improved, so as to improve the vibration damping effect after absorbing a stress.

The mechanical arm for transportation generates displacement, deformation and vibration when it moves or rotates at high speed. If the amplitude generated by movement of the mechanical arm made of a polymeric fiber composite material swing to the stop time is too long, it takes a longer time for the swing to be stationary or the amplitude to be reduced to an acceptable level, before the next action can be performed. This will inevitably affect the throughput. Therefore, the attenuation time of the vibration must be shortened, so that the throughput will not be reduced.

It is reported in current literatures that fiber composite materials have the effect of damping vibration, but problems, such as insufficient damping reduction ratio, poor hardness characteristics and high raw material cost, are yet to be solved.

SUMMARY

The present disclosure provides a fiber composite structure, including a plurality of fiber prepreg layers including a first resin and a plurality of fibers impregnated with the first resin; and at least one composite resin including a plurality of multilayered carbon nanotubes and a second resin, and being disposed between two of the fiber prepreg layers, wherein the composite resin layer and the fiber prepreg layers wind together to form a hollow tube body, in which the ratio of the number of layers of the composite resin layer to the fiber prepreg layers is from 1:4 to 1:7, and each composite resin layer covers 40% to 60% of the area of the adjacent fiber prepreg layers.

BRIEF DESCRIPTION OF DRAWINGS

The disclosure can be more fully understood by reading the following description of the embodiments, with reference made to the accompanying drawings, wherein.

DETAILED DESCRIPTION

The following specific embodiments are used to illustrate the disclosure of the present disclosure. After reading the disclosure of the present specification, those with ordinary skill in the art can readily conceive the advantages and effects of the present disclosure.

It should be noted that the structures, proportions, dimensions, etc. shown in the drawings appended to the present specification are merely for coping with the contents of the present specification, so as to enable those with ordinary skill in the art to conceive and read, instead of intending to limit the present disclosure to specification conductions. Hence, the appended drawings do not have any substantial technical significance. Any modification of the structure, the change to the proportional relationships, or the adjustment of the sizes shall all fall within the scope of the present specification, without affecting the effects and the purpose that can be achieved in the present specification. In the absence of substantial changes to the technical content, changes to or adjustments of the relative relationships should also be regarded as fallen within the implementable scope of the present disclosure.

In the fiber composite structure of the present disclosure, when the number of layers of composite resin layer and the fiber prepreg layers are at a specific ratio, the vibration damping effect can be substantially improved, while maintaining the hardness characteristics of the material. In addition, the composite resin layer of the present disclosure just needs to partially cover the fiber prepreg layers to achieve a similar or better vibration damping effect, while reducing the area used by 40% to 60% and having similar or better mechanical strength, enabling a broader spectrum of applications and high competitiveness in various products made of the fiber composite structure of the present disclosure.

Figure 1:
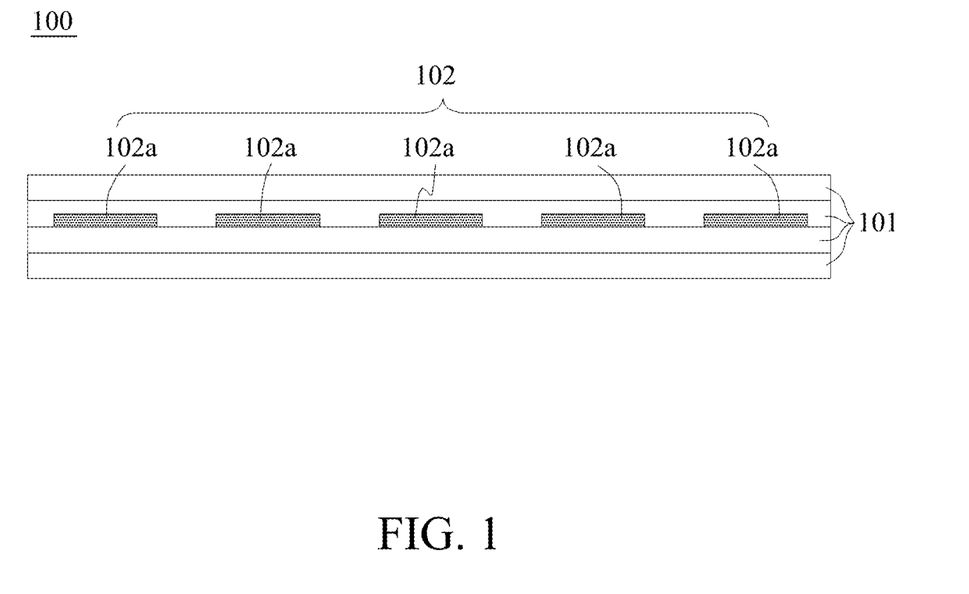
FIG. 1 is a cross-sectional view of a fiber composite structure before winding according to an embodiment of the present disclosure.
Figure 2:
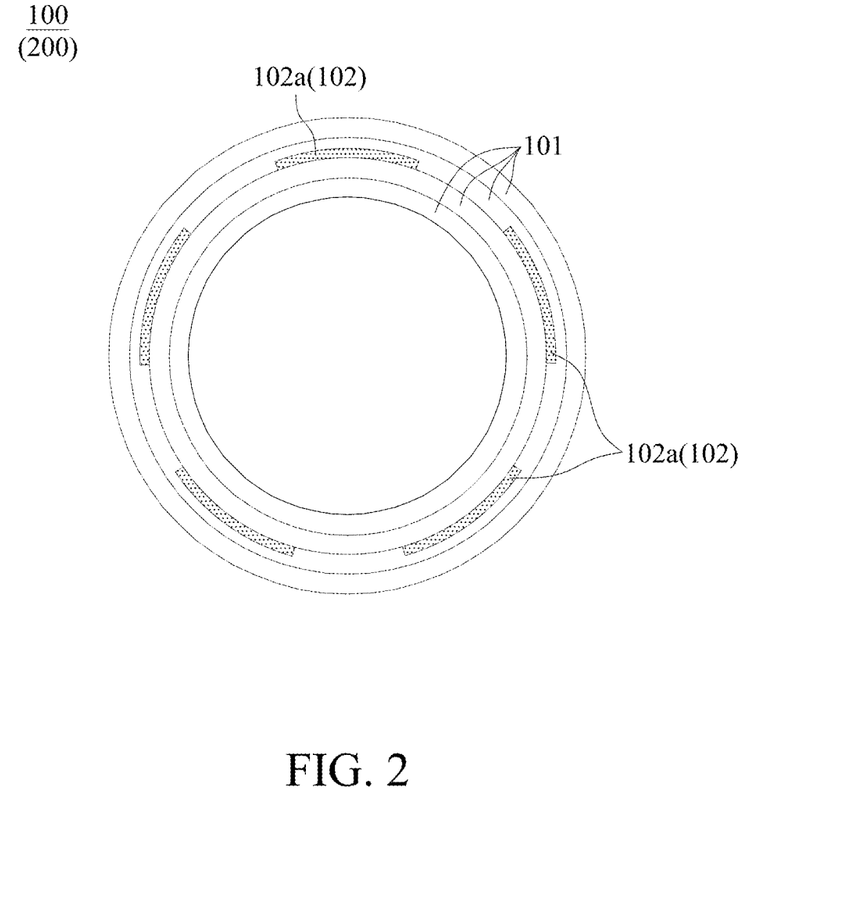
FIG. 2 is a cross-sectional view of a fiber composite structure according to the embodiment of the present disclosure.

FIGS. 1 and 2 are cross-sectional views of a fiber composite structure before and after winding according to an embodiment of the present disclosure. As shown in the figures, the present disclosure provides a fiber composite structure 100 including a plurality of fiber prepreg layers 101 and at least one composite resin layer 102. Each of the fiber prepreg layers 101 includes a first resin and a plurality of fibers impregnated with the first resin. Each composite resin layer 102 includes a plurality of multilayered carbon nanotubes and a second resin, and is disposed on the two-fiber prepreg layer 101, and is disposed between the two of the fiber prepreg layers 101, and the composite resin layer and the fiber prepreg layers 101 wind (wrap) together to form a hollow tube body 200, in which the ratio of the number of layers of the composite resin layer 102 to the fiber prepreg layers 101 is from 1:4 to 1:7, and each composite resin layer 102 covers 40% to 60% of the area of the adjacent fiber prepreg layers 101. In the figure, taking the ratio of the number of layers of the composite resin layer 102 to the fiber prepreg layers 101 is 1:4 as an example, the hollow tube body 200 has a total of five layers, of which the composite resin layer 102 is disposed as the third layer, and the fiber prepreg layers 101 are disposed as the remaining layers. In other examples, the ratio of the number of layers of the composite resin layer 102 to the fiber prepreg layers 101 can be 1:5, 2:11, 1:6, 2:13, or 1:7, and the composite resin layer 102 can be disposed as any layer, but the present disclosure is not limited thereto. In this embodiment, the fiber composite structure 100 having a specific ratio of the number of layers is wound around to form the hollow tube body 200, and FIG. 2 shows an aspect of the fiber composite structure 100 wraps around by one turn. Actually, the hollow tube body 200 can be formed by winding fiber composite structure 100 many times to form the hollow tube body 200 as needed, but the present disclosure is not limited thereto.

The phrase "wind together to form a hollow tube body" referred to a multilayered structural shell in which the fiber prepreg layers 101 and the composite resin layer 102 are stacked on each other to form a hollow tube body 200. The term "ratio of the number of layers" mentioned in the present disclosure refers to on the hollow tube body 200 when the fiber prepreg layer 101 or the composite resin layer 102 is circled as one layer, by counting the fiber prepreg layers 101 or the composite resin layer 102 wound around by one turn as one layer.

In the present disclosure, when the ratio of the number of layers of the composite resin layer 102 and the fiber prepreg layers 101 is from 1:4 to 1:7, the vibration damping effect can be substantially improved, while maintaining hardness characteristics of the material. Reference can be made to U.S. patent application Ser. No. 16/129,931 and US Patent Publication No. US2014/0154456A1, the entireties of which are deemed as parts of the present specification. In an embodiment, the total number of layers of the hollow tube body 200 is at least five. When the total number of layers is not more than eight, there will be one or two composite resin layers 102. When the total number of layers exceeds eight, the five to eight layers adjacent to each other, there will be at least one composite resin layer 102, which can be disposed as layer at the same or different positions. For example, the composite resin layer 102 is disposed as a fixed second layer or any random layer. In other embodiments, layers of different numbers can be combined and stacked. For example, five layers are initially stacked (the composite resin layer 102 is disposed at the second layer), and eight layers later stacked (the composite resin layer 102 is disposed at the fourth or sixth layer). The ratio of the number of layers (2:11) of the final composite resin layer 102 to the fiber prepreg layers 101 also falls within the scope of the present disclosure, but the present disclosure is not limited thereto. Generally speaking, the ratio of the number of layers of the composite resin layer 102 to the fiber prepreg layers 101 of the hollow tube body 200 would fall within the range of from 1:4 to 1:7, but if the total number of layers of the hollow tube body 200 is not the sum, the multiple or the sum of multiples of the integer of from 5 to 8, there might be a number of extra layers (the composite resin layer 102 or the fiber prepreg layers 101). Therefore, as long as 90% or more of the total number of layers are arranged depending on the ratio of the number of layers of the present disclosure, without affecting the overall vibration damping effect and structural rigidity (with effect within 5%) of the original hollow tube body (part of the layer proportion of the present disclosure), it also falls within the scope of the present disclosure.

Figure 3:
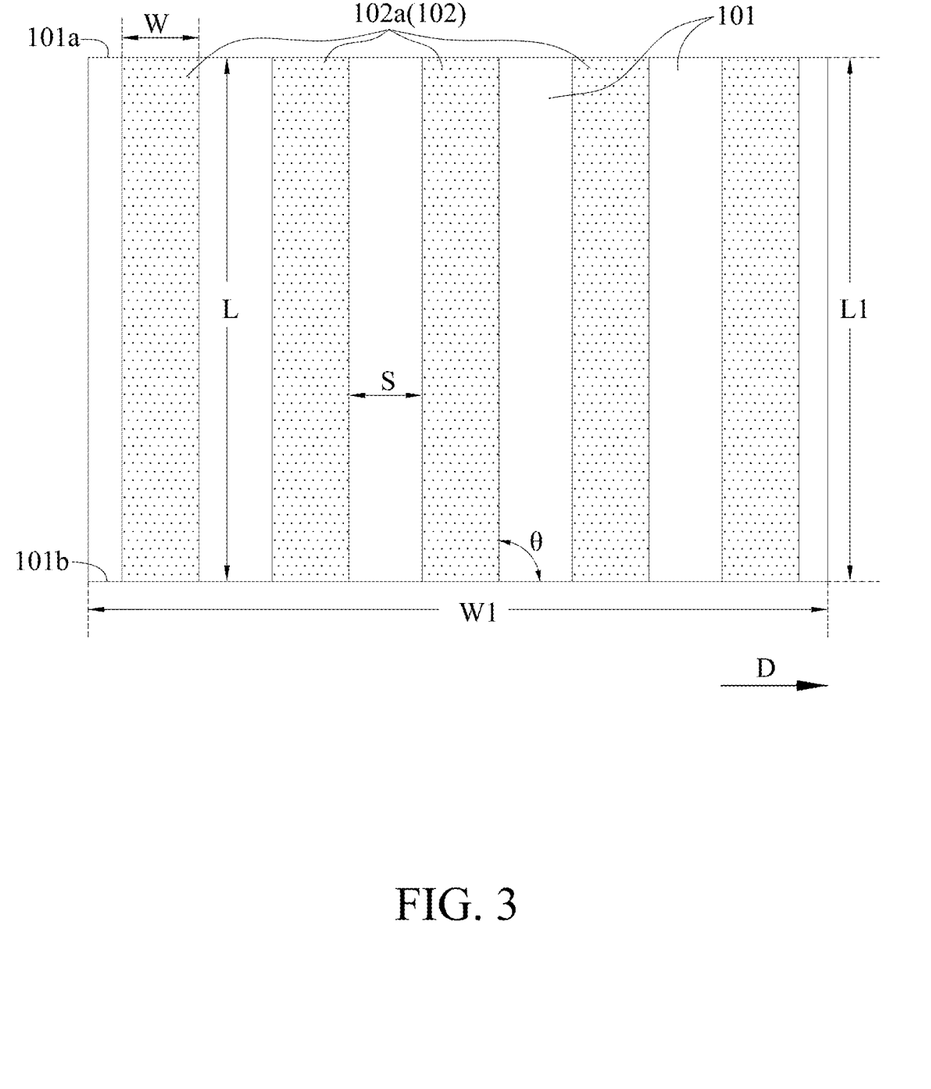
FIG. 3 is a schematic diagram depicting a method for preparing a fiber composite structure according to the embodiment of the present disclosure.

As shown in FIGS. 1 to 3, each composite resin layer 102 includes a plurality of bar-shaped structures 102a, and the total area of the bar-shaped structures 102a covers 40% to 60% of the area of the adjacent fiber prepreg layers 101. In the present disclosure, each of the bar-shaped structures 102a has a length L and a width W, which can be the same or different from each other. In one embodiment, each composite resin layer 102 has two to eight bar-shaped structures 102a, but the present disclosure is not limited thereto. In one embodiment, the width W of each of the bar-shaped structures 102a is from 10% to 30% of the tube perimeter of the hollow tube body 200, and the length L of each of the bar-shaped structures 102a is greater than or equal to the length of the hollow tube body 200. Each of the bar-shaped structures 102a is connected along the hollow tube body 200 from one open end of the hollow tube body 200 to the opposite open end thereof. In an embodiment, the length-extending direction of each of the bar-shaped structures 102a and the central axis direction of the hollow tube body 200 have an included angle of from 0 degree to 45 degrees, for example, 0 degree, 5 degrees, 10 degrees, 15 degrees, 20 degrees, 25 degrees, 30 degrees, 35 degrees, 40 degrees, or 45 degrees.

The term "tube perimeter" mentioned in the present disclosure refers to the distance of the composite resin layer 102 or the fiber prepreg layers 101 wound around by one turn to be formed as layers in the hollow tube body 200, and the distance varies with the number of layers and position of the layers disposed. For example, the tube perimeter of the composite resin layer 102 would get larger, as the position of the layers gets closer to the outer layer. The term "length-extending direction" mentioned in the present disclosure refers to a tangential direction or extending direction of the bar-shaped structures 102a on the hollow tube body 200 towards a length direction (L).

In the present disclosure, a distance S between two adjacent bar-shaped structures 102a can be the same or different. In an embodiment, the bar-shaped structures 102a can be arranged equally, symmetrically or irregularly. In the cross-sectional view of the plurality of bar-shaped structures in the hollow tube body, the bar-shaped structures 102a can exhibit radially symmetrical distribution, spaced staggered distribution or irregular distribution, but the present disclosure is not limited thereto. In an embodiment, the width W and the pitch S of the bar-shaped structures 102a are the same, and they are arranged equally. For example, the width W and the pitch S of the bar-shaped structures 102a are all ¼, ⅙, ⅛ or 1/10 of the tube perimeter, and the plurality of bar-shapes in the cross-sectional view of the hollow tube body can show a radially symmetrical distribution or spaced staggered distribution. In other embodiments, the width W and the pitch S of the bar-shaped structures 102a can be partly the same or different from each other, and they can be arranged equally or irregularly, but the present disclosure is not limited thereto.

In an embodiment, each composite resin layer 102 is composed of a plurality of bar-shaped structures 102a arranged at a distance from each other, and the spacing S can be the same or different. In other embodiments, in addition to the bar-shaped structures, each composite resin layer 102 can also include other pattern structures, such as a circle, an oval, a triangle, or a polygon, etc., where these bar-shaped structures 102a and other pattern structures cover 40% to 60% of the area of the adjacent fiber prepreg layers 101. Compared with the composite resin layer disposed integrally, the composite resin layer 102 of the present disclosure just needs to be partially disposed to achieve a similar or better vibration damping effect, and simultaneously having similar or better rigid structure and saved material cost.

In the present disclosure, the plurality of fibers of the fiber prepreg layers 101 are impregnated with the first resin, and the material of the plurality of fibers includes carbon fiber, glass fiber, aromatic polyamide fiber (for example, Twaron or Kevlar), boron fiber, nylon fiber, Teflon fiber, cotton fiber, wool fiber, steel fiber, aluminum fiber, Ceramics Whisker fiber or a combination thereof; composite resin layer 102 is formed by mixing the plurality of multilayered carbon nanotubes and the second resin, wherein the first resin and the second resin can be the same or different, and can include a thermoplastic resin, a thermosetting resin, or a combination thereof. In one embodiment, the thermoplastic resin can include, for example, polycarbonate (PC), nylon (Nylon), polypropylene (PP), polyphenylene sulfide (PPS), or polyetheretherketone (PEEK). The thermosetting resins can include epoxy resins as examples.

In general, the method for preparing the fiber prepreg layers 101 includes manual lamination, spray-coating, lamination, continuous lamination, resin injection molding, winding molding, sheet molding (SMC), block molding (BMC), and prepreg molding, autoclave molding, etc. In addition, the arrangement angle of a plurality of fibers in each of the fiber prepreg layers 101 can be adjusted to achieve desired mechanical or physical characteristics.

In the present disclosure, the composite resin layer 102 is formed by mixing the plurality of multilayered carbon nanotubes and the second resin, wherein the surfaces of the plurality of multilayered carbon nanotubes has reactive functional groups chosen from an amino group, a carboxyl group, a hydroxyl group, or an acyl chloride group. It is believed that when an external force causes a relative displacement (sliding) between the second resin and the walls of the plurality of multilayered carbon nanotubes, the integral of the displacement difference and the shear force between the interfaces is equal to the energy loss generated, i.e., the vibration damping effect can occur. Compared with monolayered carbon nanotubes, the multilayered walls of multilayered carbon nanotubes can provide more microslipping, and the accumulated damping characteristics can be quickly amplified, which can more effectively suppress vibration. In addition, the modified multilayered carbon nanotubes have higher compatibility with the second resin, and the modified method can be referred to the method disclosed in J. Mater. Chem., 2011, 21, 7337-7342.

In an embodiment, the specific surface area of each of the plurality of multilayered carbon nanotubes is from 100 $m^2/g$ to 300 $m^2/g$, and more specifically, the specific surface area of each of the plurality of multilayered carbon nanotubes can be 100 $m^2/g$, 110 $m^2/g$, 120 $m^2/g$, 130 $m^2/g$, 140 $m^2/g$, 150 $m^2/g$, 160 $m^2/g$, 170 $m^2/g$, 180 $m^2/g$, 190 $m^2/g$, 200 $m^2/g$, 210 $m^2/g$, 220 $m^2/g$, 230 $m^2/g$, 240 $m^2/g$, 250 $m^2/g$, 260 $m^2/g$, 270 $m^2/g$, 280 $m^2/g$, 290 $m^2/g$, or 300 $m^2/g$, such that the plurality of multilayered carbon nanotubes have a better mixing effect with the second resin, and the content of the plurality of the multilayered carbon nanotubes in each composite resin layer 102 is from 0.5 wt % to 8 wt %, and more specifically, the content of the multilayer nanotubes can be 0.5 wt %, 0.6 wt %, 0.7 wt %, 0.8 wt %, 0.9 wt %, 1.0 wt %, 2 wt %, 3 wt %, 4 wt %, 5 wt %, 6 wt %, 7 wt % or 8 wt %. In contrast, the content of the second resin in each composite resin layer 102 is from 92 wt % to 99.5 wt %, and more specifically, the content of the second resin can be 92 wt %, 93 wt %, 94 wt %, 95 wt %, 96 wt %, 97 wt %, 98 wt %, 99 wt %, or 99.5 wt %.

In an embodiment, the thickness of each of the fiber prepreg layers 101 can be from 50 μm to 200 μm, for example, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, or 200 μm. The thickness of the composite resin layer 102 can be from 5 μm to 200 μm, and the thickness here can be adjusted according to the requirement of the rigid strength of the prepared component, for example, 5 μm, 10 μm, 15 μm, 20 μm, 25 μm, 30 μm, 35 μm, 40 μm, 45 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, or 200 μm.

According to the method for the present disclosure, the fiber composite structure 100 (hollow tube body 200) is molded by heating. During the heating process, the reactive functional groups of the plurality of multilayer carbon nanotubes are bonded to the first resin and the second resin and cured.

FIG. 3 is a schematic diagram depicting a method for preparing a fiber composite structure according to an embodiment of the present disclosure. As shown in the figure, the present disclosure provides a method for preparing the fiber composite structure 100, and the steps thereof include:

Step (A1): laying the plurality of bar-shaped structures 102a of the composite resin layer 102 on one of the fiber prepreg layers 101 at the distance S to expose parts of the fiber prepreg layers 101, wherein the bar-shaped structures 102a cover 40% to 60% of the total area of the fiber prepreg layers 101. In this embodiment, a length L1 of the fiber prepreg layer 101 is equal to the length of the hollow tube body 200, and a width W1 is equal to the tube perimeter of the hollow tube body 200. In an embodiment, the laying is such that each of the bar-shaped structures 102a extends from a first end 101a to a second end 101b of the fiber prepreg layer 101, and the length direction and a winding direction D of each of the bar-shaped structures 102a have an included angle θ of from 45 degrees to 90 degrees. Therefore, the length L of each of the bar-shaped structures 102a is greater than or equal to the length of the hollow tube body 200, and the width W of each of the bar-shaped structures 102a is 10% to 30% of the tube perimeter of the hollow tube body 200.

Step (B1): laying another fiber prepreg layer 101 on these bar-shaped structures 102a, so that a composite resin layer 102 is disposed between the two fiber prepreg layers 101. Next, the composite resin layer 102 and the fiber prepreg layer 101 are stacked at a ratio of number of layers of from 1:4 to 1:7, so as to form the fiber composite structure 100 before winding.

Step (C1): winding together the fiber prepreg layer 101 and the composite resin layer 102 along the winding direction D to form the hollow tube body 200, and then molding.

In this step, the hollow core body 200 in FIG. 2 can be formed by directly winding on a tubular core mold in a circle. In other embodiments, when the width W1 of the fiber prepreg layer 101 exceeds the tube perimeter of the hollow tube body 200, the hollow tube body 200 can be stacked outward after being wound once, but the present disclosure is not limited thereto. In the present disclosure, the bar-shaped structures 102a will have a three-dimensional structure after being wound, wherein the length-extending direction of each bar-shaped structure 102a and the central axis direction of the hollow tube body 200 have an included angle of from 0 degree to 45 degrees.

Figure 4:
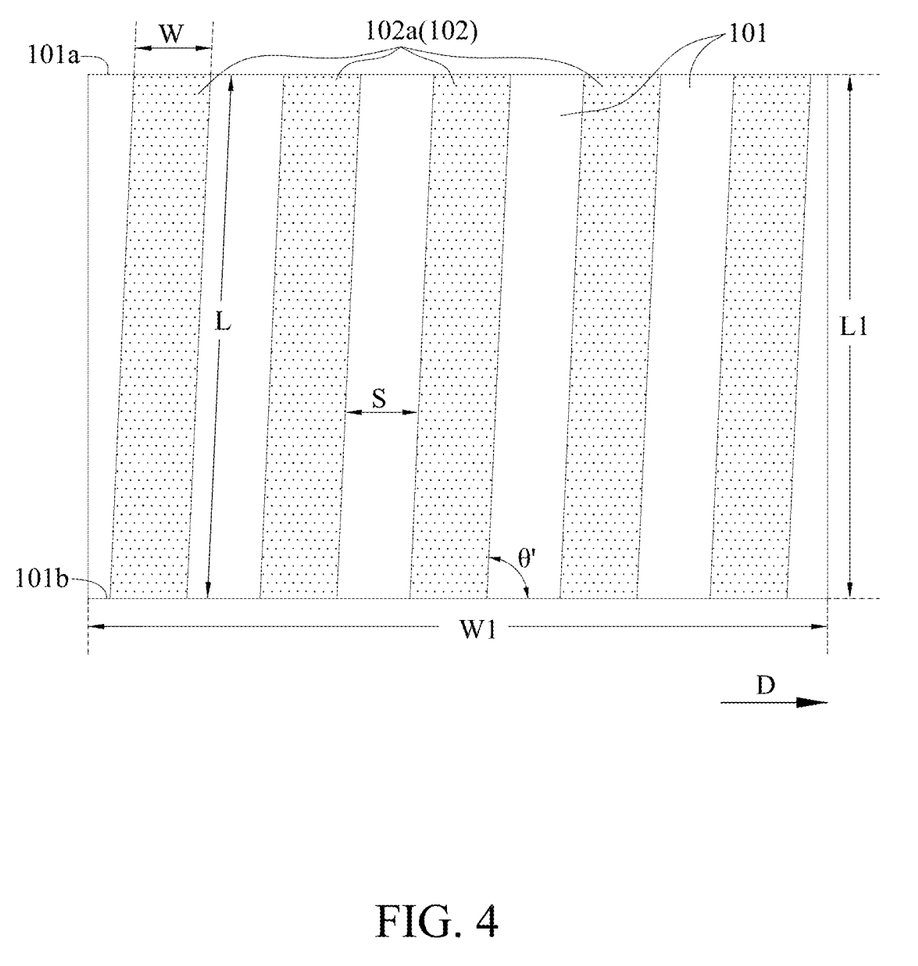
FIG. 4 is a schematic diagram depicting a method for preparing a fiber composite structure according to another embodiment of the present disclosure.

FIG. 4 is a schematic diagram depicting a method for preparing a fiber composite structure according to another embodiment of the present disclosure. The preparation method is similar to that depicted in FIG. 3, but has the main difference in step (A1): the laying angle θ' of each of the bar-shaped structures 102a is different.

In general, the method for forming a fiber composite structure involves a laminating approach, i.e., after laminating different materials at desired ratio of the number of layers, winding and shaping, as shown in FIGS. 3 and 4. However, this method is less economical when manufactured in industrial mass production.

Figure 5A:
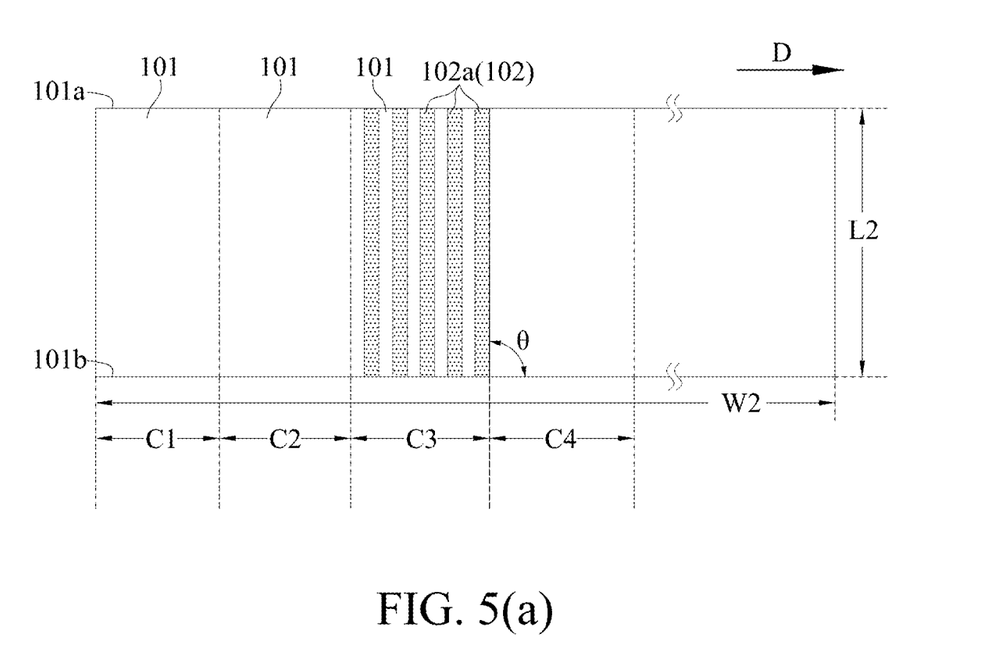
FIGS. 5(a) and 5(b) are a top view and a side view, respectively, depicting a method for preparing a fiber composite structure according to yet another embodiment of the present disclosure.
Figure 5B:
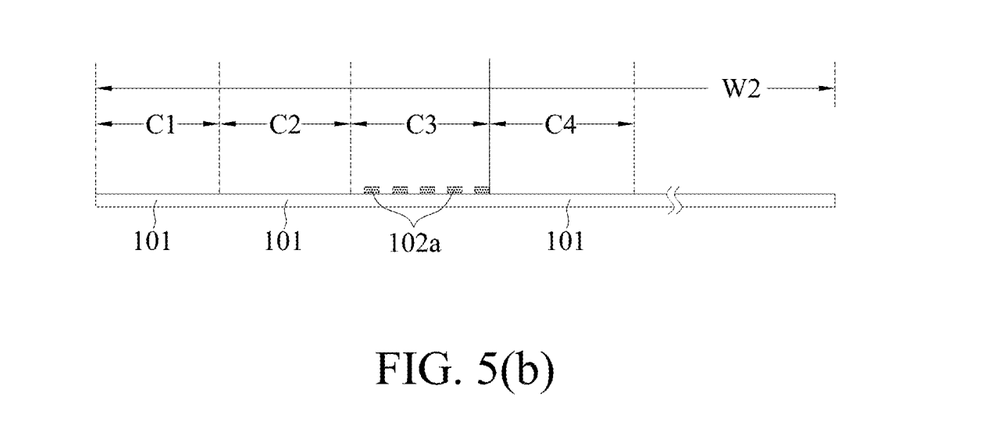

FIG. 5 is a schematic diagram depicting a method for preparing a fiber composite structure according to yet another embodiment of the present disclosure. As shown in the figure, the present disclosure further provides a method for preparing the fiber composite structure 100, wherein FIG. 5 (a) is a top view of the laminated fiber prepreg layers and a composite resin layers, and FIG. 5 (b) is a side view of the laminated fiber prepreg layers and a composite resin layers, and the steps thereof include:

Step (A2): providing the fiber prepreg layer 101 having a length L2 and a width W2, where the length L2 is equal to the length of the hollow tube body 200, and the width W2 is equal to the sum of the tube perimeters of all of the fiber prepreg layers 101 of the hollow tube body 200. For example, the width of the first fiber prepreg layer 101 is a tube perimeter C1, and the width of the second fiber prepreg layer 101 is a tube perimeter C2, the width of the third fiber prepreg layer 101 is a tube perimeter C3, the width of the fourth fiber prepreg layer 101 is a tube perimeter C4, and so on. The width W2 is determined based on the sum of the tube perimeters of all of the fiber prepreg layers 101 in the hollow tube body 200. Next, the plurality of bar-shaped structures 102a of the composite resin layer 102 are laid on the fiber prepreg layer 101 at intervals. The bar-shaped structures 102a can be selectively laid on region(s) within a predetermined number of layers (for example, C1, C2, C3, or C4), exposing parts of the fiber prepreg layers 101 in the region(s), wherein the total area covered by the bar-shaped structures 102a in the region is from 40% to 60%. In an embodiment, each of the bar-shaped structures 102a are laid by extending from the first end 101a to the second end 101b of the fiber prepreg layer 101, and the length direction and the winding direction D of each of the bar-shaped structures 102a have an included angle θ of from 45 degrees to 90 degree.

Step (B2): winding the fiber prepreg layers 101 and the composite resin layer 102 together along the winding direction D to form the hollow tube body 200, and finally molding. In this step, a tubular core mold is used for winding. After a first turn (C1) is completed, the winding is continued until the width W2 of the fiber prepreg layers 101 is completed, so that the composite resin layer 102 and the fiber prepreg layers 101 are at a ratio of the number of layers of from 1:4 to 1:7. In this embodiment, when wound into the C4 area, the total number of layers of the hollow tube body is 5, wherein the composite resin layer 102 would be disposed as the third layer, and the position of the composite resin layer 102 can be adjusted as required. Because the winding is performed inside out, the outer tube perimeter will be larger (i.e., C4>C3>C2>C1). In the present disclosure, the bar-shaped structures 102a would have a three-dimensional structure after being wound, wherein the length-extending direction of each of the bar-shaped structures 102a and the central axis direction of the hollow tube body 200 have an included angle of from 0 degree to 45 degrees.

Therefore, the present disclosure can more economically mass-produce fiber composite structures 100 in a single batch by the above-mentioned preparation method.

According to the manufacturing method for the present disclosure, the cross-section shape of the formed hollow tube body 200 includes a circle, an oval, a square, a rectangle, a polygon, and the like, but the present disclosure is not limited thereto.

Details of the present disclosure are illustrated by way of examples. However, the interpretation of the present disclosure should not be limited to the description of the following examples.

Example 1

The manufacturing method and conditions in Example 1 (No. E1) of the present disclosure are described below. The materials are described as follows. Fiber: carbon fiber (purchased from Toray, model no. T700SC, 12K); resin: epoxy resin (purchased from Dow Chemical, model no. Epon 828); a plurality of multilayered carbon nanotubes (purchased from Xinyun Enterprise, model no. A-MWCNT1020); modified functional group: amino group (according to J. Mater. Chem., 2011, 21, 7337-7342, method section).

Referring to the preparation method depicted in FIG. 5, two pieces of the composite resin layer 102 having the bar-shaped structures 102a (the plurality of multilayered carbon nanotubes were 5 wt % based on the composite resin layer 102 as a whole, with a thickness of 70 μm) were laid in parallel to the position of layers at the fifth turn of the fiber prepreg layer 101 (thickness of 100 μm), so that the composite resin layer 102 covered 50% of the area of the adjacent fiber prepreg layers 101, wherein the width W of each of the bar-shaped structures 102a was ¼ of the tube perimeter of the hollow tube body 200, and the distance S between two adjacent bar-shaped structures 102a was ¼ of the tube perimeter of the hollow tube body 200. The included angle θ was 90 degrees, the width W2 of the fiber prepreg layer 101 was equal to the sum of the tube perimeters of 20 layers, and the length L2 was equal to the length of the hollow tube body 200. The above combination was used as a repeating unit (i.e., the ratio of the number of layers of the composite resin layer 102 to the fiber prepreg layer 101 was 1:5), and the application was repeated 4 times to form a composite body.

When molding, a core mold was prepared and then covered with a plastic air bag, and the composite body was wound around the core mold in an arrow direction D. Then, the core mold covered with the composite body was placed into another aluminum mold for fixation. Then, the plastic air bag was removed, and the core mold was pulled out for inflating gas (25 psi to 30 psi) in the space thereof to support the formed hollow tube body 200. At the same time, a pressure of from 20 psi to 25 psi was exerted on the aluminum mold, and heated at 160° C. for 40 minutes. After cooling to room temperature, the fiber composite structure 100 was taken out. After molding, the four composite resin layers 102 are respectively located between the fourth and fifth, ninth and tenth, fourteenth and fifteenth, and nineteenth and twentieth fiber prepreg layers 101.

Figure 6A:
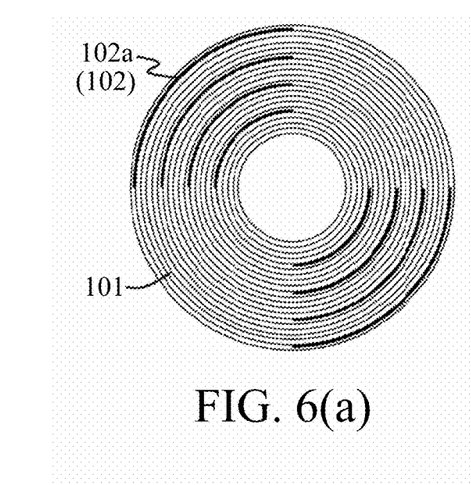
FIGS. 6(a) to 6(f) are schematic cross-sectional views of the fiber composite structure according to the Examples 1-5 of the present disclosure and Comparative Example 3, respectively.

As shown in FIG. 6(a), the fiber composite structure 100 is a hollow tube body 200, including the fiber prepreg layers 101 and the composite resin layers 102. The cross-sectional view of the fiber structure 100a shows these bar-shaped structures 102a in a radially symmetrical distribution. The prepared hollow tube body is a hollow cylindrical tube having the following dimensions: a length of 450 mm, a diameter of 20 mm, and a thickness of 4.0 mm.

Example 2

Figures 6B, 6C:
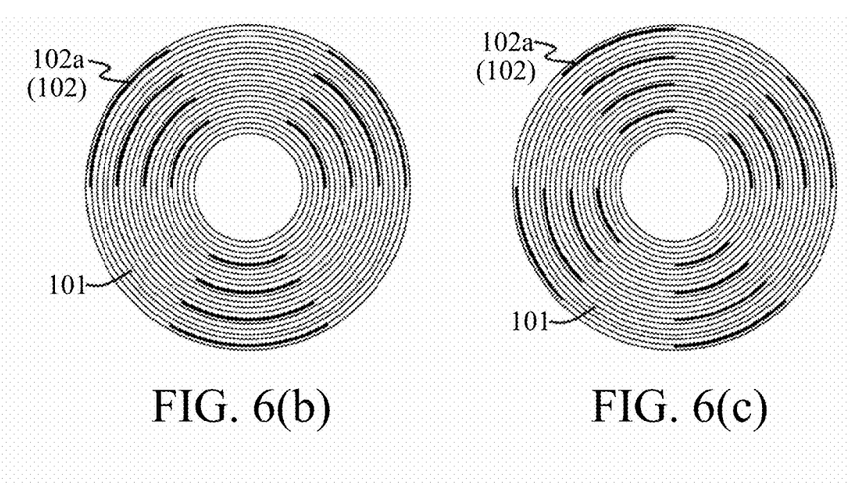

The preparation method and conditions in Example 2 (No. E2) of the present disclosure was the same as described Example 1, but having main differences in the width W, the interval S, and the number of the bar-shaped structures 102a in the composite resin layers 102. The composite resin layers 102 had three bar-shaped structures 102a. The width W of each of the bar-shaped structures 102a was equal to ⅙ of the perimeter of the hollow tube body 200. The distance S between two adjacent bar-shaped structures 102a was equal to ⅙ tube perimeter of the hollow tube body 200. A cross-sectional view of the fiber composite structure 100 of Example 2 is shown in FIG. 6(b).

Example 3

Figure 7:
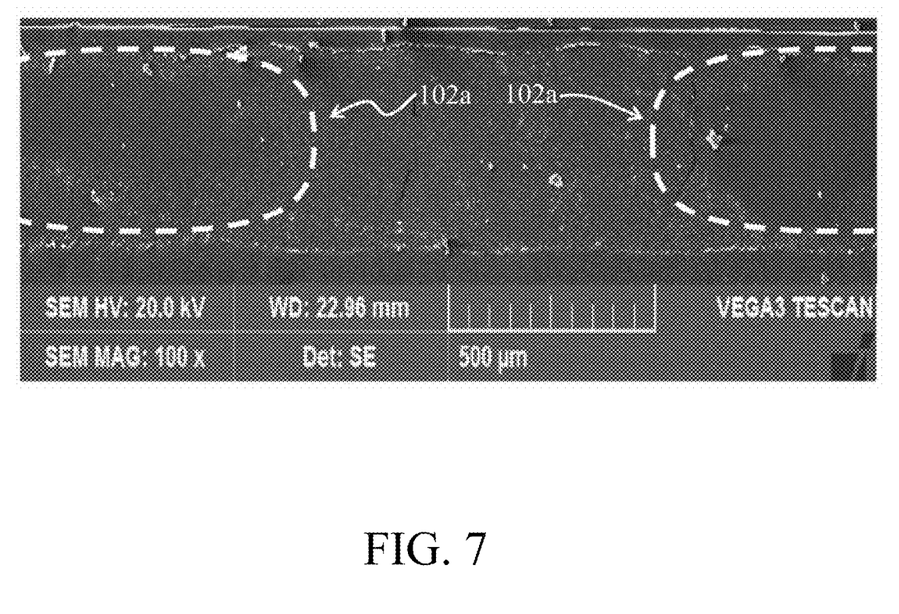
FIG. 7 is a partial scanning electron microscope (SEM) image of a fiber composite structure according to Example 3 of the present disclosure.

The preparation method and conditions in Example 3 (No. E3) of the present disclosure was the same as described Example 1, but having main differences in the width W, the interval S, and the number of the bar-shaped structures 102a in the composite resin layers 102. The composite resin layers 102 had four bar-shaped structures 102a. The width W of each of the bar-shaped structures 102a was equal to ⅛ of the perimeter of the hollow tube body 200. The distance S between two adjacent bar-shaped structures 102a was equal to ⅛ tube perimeter of the hollow tube body 200. A cross-sectional view of the fiber composite structure 100 of Example 3 is shown in FIG. 6(c). As shown in FIG. 7, the bar-shaped structures 102a in the fiber composite structure 100 are in a discontinuous state, and separated from each other.

Comparative Example 1

The preparation method and conditions of Comparative Example 1 (No.: C1) were the same as described in Example 1, but having the main differences in that the composite resin layers 102 were not laid on the fiber prepreg layers 101, and 20 fiber prepreg layers were directly wound to form the fiber composite structure 100.

Comparative Example 2

The preparation method and conditions of Comparative Example 2 (No.: C2) were the same as described in Example 1, but having the main differences in that the composite resin layers 102 were laid integrally, wherein each of the composite resin layers 102 had only one bar-shaped structure 102a. That is, the width W of the bar-shaped structure 102a was equal to the entire tube perimeter of the hollow tube body 200. In addition, after molding, the four composite resin layers 102 were respectively located between the fourth and fifth, eighth and ninth, twelfth and thirteenth layers, and sixteenth and seventeenth fiber prepreg layers 101.

Performance Testing

The measurement of the vibration attenuation time (seconds, S) was performed using a laser displacement meter (Polytec OFV 350 Sensor hand) to measure the time from the start of vibration (one end of the sample was fixed, and the other end of the sample was released after applying a load of 2 Kg) to rest. After the measured signal was calculated by a software, the value of natural frequency and loss factor could be obtained.

Performance tests were performed on the fiber composite structures of Examples 1-3 and Comparative Examples 1-2, and the situation of vibration attenuation, natural frequency and loss factors were obtained, as shown in Table 1.

TABLE 1

| No | Number of fiber prepreg layers | Multilayered carbon nanotubes (content) | Number of composite resin layers | Width W of each bar-shaped structure | Full Vibration amplitude at 0.2 sec. (mm) | Reduction in Relative Full Amplitude (v. C1) | Natural Frequency (Hz) | Loss factor |
|---|---|---|---|---|---|---|---|---|
| C1 | 20 | — | 0 | — | 0.575 | — | 140 | 0.0410 |
| C2 | 20 | 5 wt % | 4 | Full tube perimeter | 0.162 | 72.2% | 148 | 0.0462 |
| E1 | 20 | 5 wt % | 4 | ¼ of tube perimeter | 0.126 | 78% | 145 | 0.0459 |
| E2 | 20 | 5 wt % | 4 | ⅙ of tube perimeter | 0.092 | 84% | 149 | 0.0459 |
| E3 | 20 | 5 wt % | 4 | ⅛ of tube perimeter | 0.075 | 86.9% | 156 | 0.0465 |

Note:
natural frequency(n) refers to the dynamic characteristics of the structural body per se, and is proportional to the square root of the rigidity of system Ko and inversely proportional to the square root of mass Mo.

According to Table 1, compared with Comparative Example 1 in which the composite resin layers were not added, the Examples (E1 to E3) of the present disclosure produced an effect of full amplitude reduction of from 78% to 86.9%. Compared with Comparative Example 2 in which laying was done integrally, the Examples (E1 to E3) of the present disclosure in which laying was done partially provided better vibration damping effect, while maintaining rigid strength.

Example 4

Figure 6D:
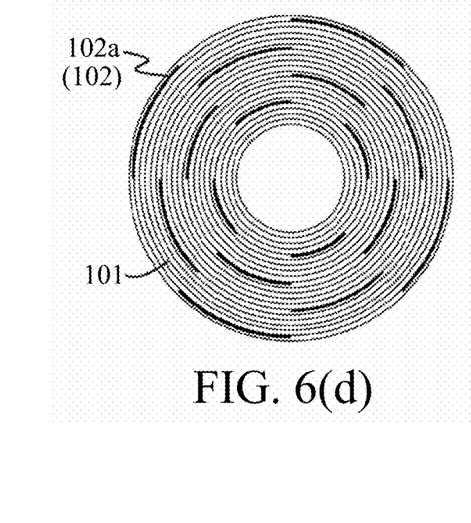

The preparation method and conditions in Example 4 (No. E4) of the present disclosure were the same as described in Example 3, but having the main difference in that the bar-shaped structures 102a were staggered at intervals. The cross-sectional view of the fiber composite structure 100 of Example 4 is shown in FIG. 6(*d*).

Example 5

Figures 6E, 6F:
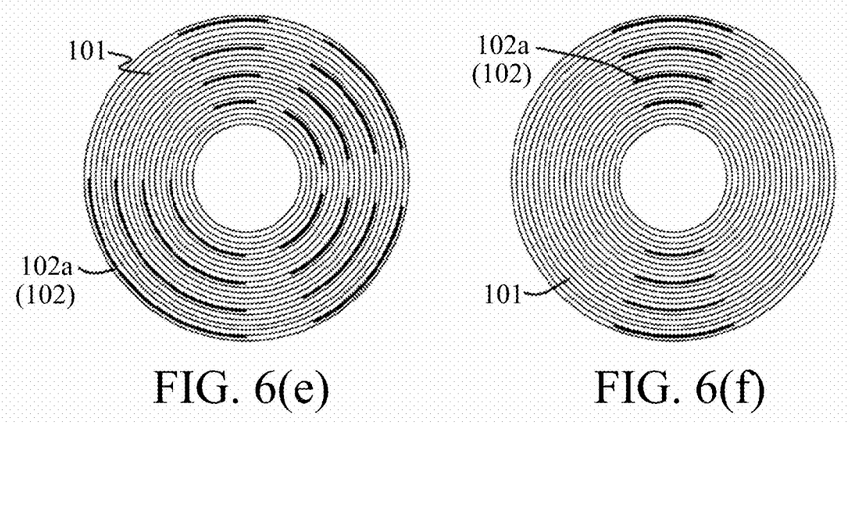

The preparation method and conditions in Example 5 (No. E5) of the present disclosure were the same as described in Example 1, but having the main differences in the width W, the interval S, and the number of the bar-shaped structures 102*a* in the composite resin layer 102. The resin layer 102 had four bar-shaped structures 102*a*, and the width W and the pitch S thereof were not identical and were distributed irregularly. The cross-sectional view of the fiber composite structure 100 of Example 5 is shown in FIG. 6(*e*).

Comparative Example 3

The preparation method and conditions in Comparative Example 3 (No. C3) were the same as described in Example 1, but having the main difference in that the width W and the interval S of the bar-shaped structures 102*a* in the composite resin layer 102, wherein the width W of each of the bar-shaped structures 102*a* was ⅛ of the tube perimeter of the hollow tube body 200, and the distance S between two adjacent bar-shaped structures 102*a* was ⅜ of the tube perimeter of the hollow tube body 200, so that the composite resin layers 102 covered 25% of the area of the adjacent fiber prepreg layers 101. A cross-sectional view of the fiber composite structure 100 of Comparative Example 3 is shown in FIG. 6(*f*).

Performance Simulation Testing

The finite element software Ansys was used to perform a structural dynamic transient analysis, and the damping coefficient of the system was converted from the envelope attenuation of the amplitude attenuation. During the analysis, solid 185 element was used, and an anisotropic carbon fiber composite material was used as the material. Finally, the vibration change within a preset time was calculated.

Performance simulation tests were performed on the fiber composite structures of Examples 3-5 and Comparative Examples 1 and 3, and the situation of vibration attenuation and the structural damping ratio were obtained, as shown in Table 2.

duced an effect of full amplitude reduction of from 69% to 76%. Although the composite resin layers of Comparative Example 3 were also partially covered (the coverage area was only 25%), the vibration damping effect and structural damping ratio were significantly lower. It can be known from the Examples (E3 to E5) of the present disclosure that under the same coverage area, the bar-shaped structures of these composite resin had better vibration damping effects when they were staggered or irregularly distributed.

The above embodiments are used to exemplify the principle of the present disclosure and the effects thereof, instead of limiting the present disclosure. Anyone skilled in the art can modify the above embodiments, without departing from the spirit and scope of the present disclosure. Therefore, the scope of the present disclosure should be accorded to the scopes of the claims appended.

What is claimed is:
1. A fiber composite structure, comprising:
   a plurality of fiber prepreg layers each comprising a first resin and a plurality of fibers impregnated with the first resin; and
   at least one composite resin layer comprising a plurality of multilayered carbon nanotubes and a second resin, and being disposed between any two adjacent ones of the fiber prepreg layers and winding together with the fiber prepreg layers to form a hollow tube body,
   wherein a ratio of the number of layers of the composite resin layer to the fiber prepreg layers is from 1:4 to 1:7, and each of the composite resin layers covers 40% to 60% of the area of adjacent fiber prepreg layers.
2. The fiber composite structure according to claim 1, wherein the plurality of fibers comprise carbon fiber, glass fiber, aromatic polyamide fiber, boron fiber, nylon fiber, Teflon fiber, cotton fiber, wool fiber, steel fiber, aluminum fiber, ceramics whisker fiber, or a combination thereof.
3. The fiber composite structure according to item 1, wherein the first resin and the second resin are the same or different, and each of the first resin and the second resin comprises a thermoplastic resin, a thermosetting resin or a combination thereof.
4. The fiber composite structure according to claim 1, wherein each of the fiber prepreg layers has a thickness of

TABLE 2

| No | Number of fiber prepreg layers | Number of composite resin layers | Number of the bar-shaped structure of each resin layer | Coverage area of composite resin layers | Width W of each bar-shaped structure | spaces of any two adjacerd bar-shaped structures | structural damping ratio | Reduction in Relative Full Amplitude (v. C1) | aspect of distribution of composite resin layers |
|---|---|---|---|---|---|---|---|---|---|
| C1 | 20 | 0 | — | — | — | — | 0.0146 | — | — |
| C3 | 20 | 4 | 2 | 25% | ⅛ of tube perimeter | ⅜ of tube perimeter | 0.0241 | 65% | radially symmetrial |
| E3 | 20 | 4 | 4 | 50% | ⅛ of tube perimeter | ⅛ of tube perimeter | 0.0248 | 69% | radially symmetrial |
| E4 | 20 | 4 | 4 | 50% | ⅛ of tube perimeter | ⅛ of tube perimeter | 0.0257 | 76% | spaced staggered |
| E5 | 20 | 4 | 4 | 50% | ⅛ of tube perimeter | any tube perimeter | 0.0256 | 75% | irregular |

Note:
The structural damping ration is used for describing the oscillation and attenuation after a system is interfered, and a higher ratio indicates better vibration damping effect.

According to Table 2, compared to Comparative Example 1, the Examples (E3 to E5) of the present disclosure profrom 50 μm to 200 μm, and each of the composite resin layers has a thickness of from 5 μm to 200 μm.

5. The fiber composite structure according to claim 1, wherein each of the at least one composite resin layer comprises a plurality of bar-shaped structures, and a sum of areas of the plurality of bar-shaped structures occupies from 40% to 60% of an area of adjacent fiber prepreg layers.

6. The fiber composite structure according to claim 5, wherein each of the bar-shaped structures has a width of from 10% to 30% of a tube perimeter of the hollow tube body.

7. The fiber composite structure according to claim 6, wherein each of the bar-shaped structures is connected along the hollow tube body from an open end of the hollow tube body to an opposite open end thereof.

8. The fiber composite structure according to claim 5, wherein each of the bar-shaped structures has a length greater than or equal to a length of the hollow tube body.

9. The fiber composite structure according to claim 8, wherein each of the bar-shaped structures is connected along the hollow tube body from an open end of the hollow tube body to an opposite open end thereof.

10. The fiber composite structure according to claim 5, wherein a length-extending direction of each of the bar-shaped structures and a central axis direction of the hollow tube body have an included angle of from 0 degree to 45 degrees.

11. The fiber composite structure according to claim 10, wherein each of the bar-shaped structures is connected along the hollow tube body from an open end of the hollow tube body to an opposite open end thereof.

12. The fiber composite structure according to claim 5, wherein the plurality of bar-shaped structures are in radially symmetrical distribution, spaced staggered distribution or irregular distribution in a cross-sectional view of the hollow tube body.

13. The fiber composite structure according to claim 12, wherein each of the bar-shaped structures is connected along the hollow tube body from an open end of the hollow tube body to an opposite open end thereof.

14. The fiber composite structure according to claim 5, wherein each of the bar-shaped structures is connected along the hollow tube body from an open end of the hollow tube body to an opposite open end thereof.

15. The fiber composite structure according to claim 1, wherein each of the plurality of multilayered carbon nanotubes has a reactive functional group selected from the group consisting of an amino group, a carboxyl group, a hydroxyl group, and an acyl chloride group on a surface thereof.

16. The fiber composite structure according to claim 15, wherein the multilayered carbon nanotubes are in a content of from 0.5 wt % to 8 wt % in the composite resin layer.

17. The fiber composite structure according to claim 16, wherein each of the plurality of multilayered carbon nanotubes has a specific surface area of from 100 $m^2/g$ to 300 $m^2/g$.

18. The fiber composite structure according to claim 1, wherein the multilayered carbon nanotubes are in a content of from 0.5 wt % to 8 wt % in the composite resin layer.

19. The fiber composite structure according to claim 18, wherein each of the plurality of multilayered carbon nanotubes has a specific surface area of from 100 $m^2/g$ to 300 $m^2/g$.

* * * * *